(12) United States Patent
Tatsumi et al.

(10) Patent No.: US 7,847,441 B2
(45) Date of Patent: Dec. 7, 2010

(54) SEMICONDUCTOR INTEGRATED CIRCUIT

(75) Inventors: Masahiro Tatsumi, Kawasaki (JP); Takeshi Ishibashi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 154 days.

(21) Appl. No.: 12/339,613

(22) Filed: Dec. 19, 2008

(65) Prior Publication Data
US 2009/0160266 A1    Jun. 25, 2009

(30) Foreign Application Priority Data
Dec. 20, 2007    (JP)   ............... 2007-329329

(51) Int. Cl.
*H01H 9/54*    (2006.01)
(52) U.S. Cl. .................................................. 307/140
(58) Field of Classification Search ................ 307/140
See application file for complete search history.

(56) References Cited

U.S. PATENT DOCUMENTS
7,275,164 B2 *   9/2007   Hottelet et al. .............. 713/300

FOREIGN PATENT DOCUMENTS
JP        2006-344640 A    12/2006

* cited by examiner

*Primary Examiner*—Robert L. Deberadinis
(74) *Attorney, Agent, or Firm*—Fujitsu Patent Center

(57) ABSTRACT

A semiconductor integrated circuit includes a plurality of circuit blocks; a plurality of power switches configured to supply power or cut power supply to the corresponding circuit blocks on a circuit-block-by-circuit-block basis in accordance with logic states of first control signals; a power switch controller configured to select, upon receipt of a second control signal, which power switches to control from among the plurality of power switches, and output third control signals instructing the selected power switches to supply power or cut power supply; and a first protection circuit provided between the power switches and the power switch controller, the first protection circuit being configured to output the first control signals, which are obtained by converting the logic states of the third control signals, to the selected power switches.

9 Claims, 3 Drawing Sheets

| 入力 | | 出力 | |
|---|---|---|---|
| X1 | X2 | Y1 | Y2 |
| OFF | OFF | OFF | OFF |
| OFF | ON | OFF | ON |
| ON | OFF | OFF | OFF |
| ON | ON | ON | ON |

※forbidden

SEMICONDUCTOR INTEGRATED CIRCUIT

CROSS REFERENCE TO RELATED APPLICATION

This application is based upon and claims the benefit of priority from the prior Japanese Patent Application NO. 2007-329329 filed on Dec. 20, 2007, the entire contents of which are incorporated herein by reference.

BACKGROUND

1. Field

The embodiments discussed herein are relates to a semiconductor integrated circuit including a control circuit that supplies power to a circuit including a plurality of circuit blocks having different power systems.

2. Description of the Related Art

As metal-oxide semiconductor (MOS) transistors included in semiconductor integrated circuits are becoming more and more minute and detailed, the number of gates that can be mounted on a semiconductor integrated circuit is increasing. As the number of mounted gates included in the semiconductor integrated circuit increases, power consumed by the entire circuit increases. In order to reduce power consumption, a so-called power gating circuit has been adopted. This is a power control circuit that connects circuit blocks included in the semiconductor integrated circuit to a power supply when the circuit blocks are being used and disconnects the circuit blocks from the power supply when the circuit blocks are not being used.

Circuit blocks that use the same power supply are called power domains. A general power gating circuit includes power switches that connect/disconnect corresponding power domains including circuit blocks to/from the power supply of the entire semiconductor integrated circuit, a power management unit (PMU) that outputs control signals for controlling turning on/off of the power switches, and an isolator circuit that prevents a signal from one power domain disconnected from the power supply of the entire semiconductor integrated circuit to the other power domain connected to the power supply of the entire semiconductor circuit from entering a high impedance (Hi-Z) state, that is, a floating state (for example, see Japanese Unexamined Patent Application Publication No. 2006-344640).

However, the isolator circuit is not partially included in the following case. For example, when a circuit block A belonging to one power domain is operating, a circuit block B belonging to the other power domain operates for sure in association with the operation of the circuit block A. If the opposite relationship does not hold true, no power control is performed to prevent, when one power domain is connected to the power supply of the entire semiconductor integrated circuit, the other power domain from being connected to the power supply of the entire semiconductor integrated circuit. In that case, the power gating circuit includes no isolator circuit from the circuit block B to the circuit block A in order to reduce the number of gates.

In such a case, an incorrect power control sequence may be set in the PMU or a central processing unit (CPU) controlling the PMU because installing a control program into the PMU or CPU is separately done after completion of fabrication of the semiconductor integrated circuit. Thus, when power is being supplied to the circuit block A but no power is being supplied to the circuit block B, a signal from the circuit block B to the circuit block A becomes floating, which causes a failure of the circuit block A.

SUMMARY

According to an aspect of the present invention, there is provided a semiconductor integrated circuit including a plurality of circuit blocks; a plurality of power switches configured to supply power or cut power supply to the corresponding circuit blocks in accordance with logic states of control signals; a power switch controller configured to output, upon receipt of an instruction signal, a plurality of control signals for controlling supplying power or cutting power supply using the plurality of power switches; and a protection circuit provided between the power switches and the power switch controller, the protection circuit being configured to receive the control signals and convert the logic states of the control signals.

DESCRIPTION OF THE PREFERRED EMBODIMENTS

First and second embodiments are described follows.

First Embodiment

A semiconductor integrated circuit according to the first embodiment includes a circuit block included in one power domain, a circuit block that is included in another power domain and operates in association with the foregoing circuit block, power switches that supply power or cut power supply to the corresponding power domains in accordance with the logic states of control signals, a power switch controller that outputs a plurality of control signals for controlling supplying power or cutting power supply using the power switches, and a protection circuit that is provided between the power switches and the power switch controller, receives the control signals, and converts the logic states of the received control signals.

Figure 1:
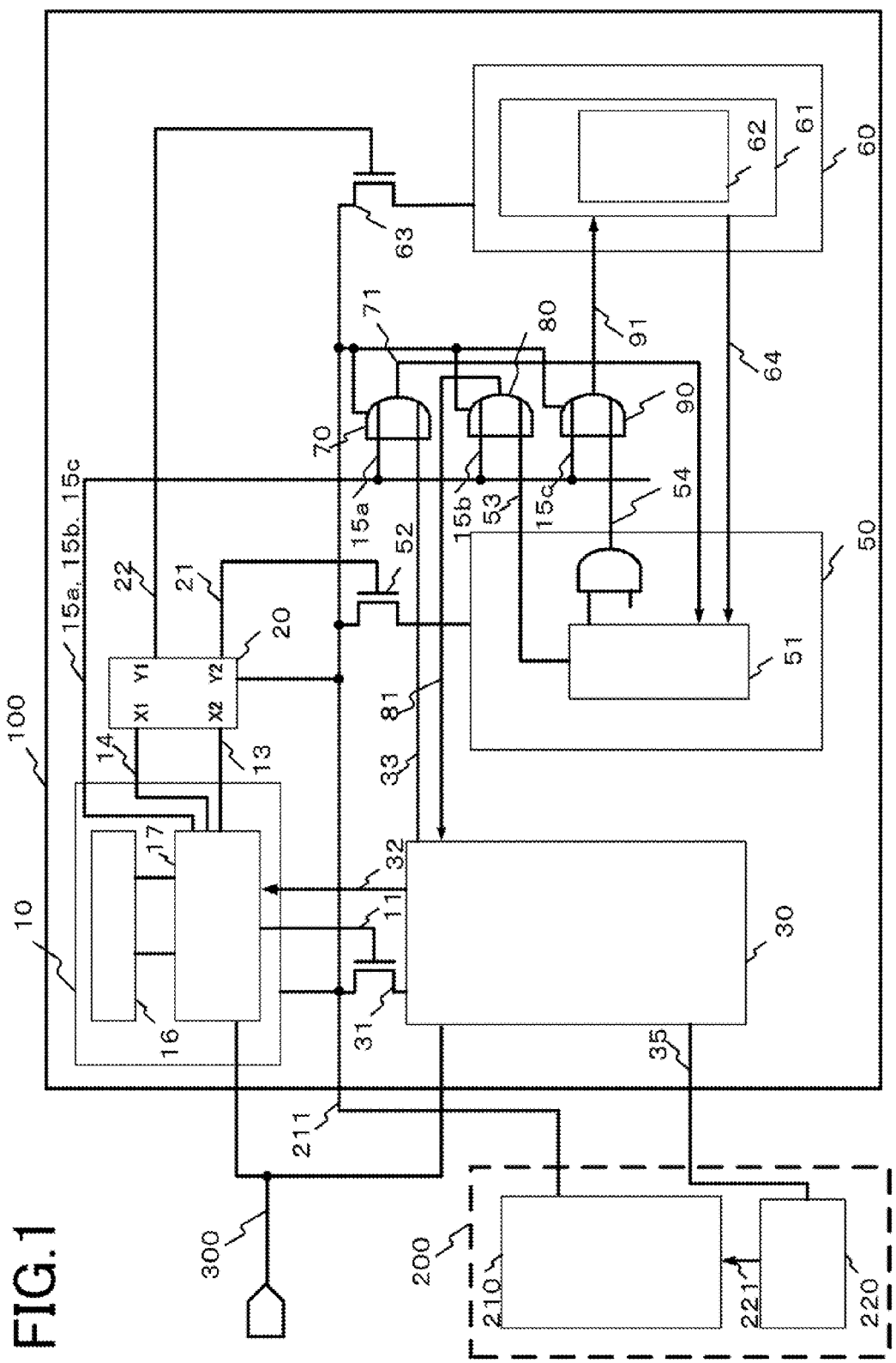
FIG. 1 is a diagram showing a semiconductor integrated circuit according to a first embodiment and a power integrated circuit (IC)

Referring to FIG. 1, a semiconductor integrated circuit 100 according to the first embodiment and a power IC 200 will be described.

The power IC 200 includes a power generator 210 and a controller 220. The controller 220 is a circuit that receives a code signal 35 from a CPU 30 included in the semiconductor integrated circuit 100 and outputs an instruction signal 221 to the power generator 210 to instruct the power generator 210 to output a voltage specified by the code signal 35. The power generator 210 is, for example, a direct current (DC) to DC converter and, in response to the foregoing instruction signal 221, applies a power supply voltage specified by the CPU 30 to the semiconductor integrated circuit 100 via a power line 211.

The semiconductor integrated circuit 100 includes a PMU 10, a protection circuit 20, the CPU 30, power domains 50 and 60, and OR circuits 70, 80, and 90.

The CPU 30 is a circuit that controls, upon receipt of an external signal 300, the operation of the semiconductor integrated circuit 100 in accordance with a command specified by the external signal 300 and a pre-loaded control program. To control the operation of the semiconductor integrated circuit 100, the CPU 30 outputs control signals 32 and 33. Power is supplied from the power line 211 to the CPU 30 via a power switch 31.

The PMU 10 includes a controller 17 and a random access memory (RAM) unit 16. The controller 17 is a circuit that controls a power gating operation in accordance with the control signal 32 from the CPU 30 or the external signal 300 and a control program loaded in advance in the RAM unit 16. Power is supplied from the power line 211 to the PMU 10.

A power gating operation is an operation for connecting or disconnecting a power line for supplying power to the CPU 30, a power line for supplying power to the power domain 50, a power line for supplying power to the power domain 60, and the like to/from a power line such as the power line 211 of the entire semiconductor integrated circuit 100 using power switches such as the power switches 31, 52, and 63. The power gating operation involves a circuit for sending a signal to an isolator including, for example, the OR circuits 70, 80, and 90 in order to isolate a signal.

The controller 17 outputs control signals 11, 13, 14, 15a, 15b, and 15c to the power switches 31, 52, and 63 and the OR circuits 70, 80, and 90 in order to control the power gating operation.

When the semiconductor integrated circuit 100 which performs a series of operations is instructed by the control signal 32 from the CPU 30 to connect or disconnect the power line for supplying power to the CPU 30 to/from the power line 211, the controller 17 performs the following operation. Here, a task is a series of operations performed by the semiconductor integrated circuit 100. A worst execution time is a time within which, starting from the beginning of a task, operations relating to the task must be completed, in association with the next task. A required processing time is a time within which, after a task has begun by the CPU 30, operations relating to the task can actually be done. A required processing time is longer than a worst execution time because of the following reason. The result obtained by performing the current task is used in the next task. In some cases, the time at which the next task can begin is not determined only by the CPU 30, but depends on the states of other circuits (e.g., the RAM unit 16). Therefore, the controller 17 recognizes, on the basis of the control signal 32 from the CPU 30, the worst execution time and the required processing time of a task executed by the CPU 30. Next, the controller 17 outputs the control signal 11 with a logic state based on which the power switch 31 is turned on from the beginning of the task to the end of the required processing time. After the required processing time has elapsed, the controller 17 outputs the control signal 11 with a logic state based on which the power switch 31 is turned off and maintains this control signal 11 until the worst execution time elapses. Thereafter, when the worst execution time relating to the task has elapsed, the controller 17 outputs the control signal 11 with a logic state based on which the power switch 31 is turned on. Power is supplied to the CPU 30, and the CPU 30 executes the next task.

The semiconductor integrated circuit 100 includes a clock generating circuit (not shown) that receives an external clock signal input from the outside of the semiconductor integrated circuit 100 and generates an internal clock signal. The controller 17 includes a circuit that counts the rising edge of the internal clock signal, starting from the beginning of a task. By counting the internal clock signal, the controller 17 can recognize the elapse of the worst execution time and the required processing time.

The power domain 50 is a power domain including an internal circuit 51. The power domain 50 is connected to the power line 211 via the power switch 52.

The internal circuit 51 is a circuit block including a logic circuit and loads and converts, for example, image data.

The power domain 60 is a power domain including an internal circuit 61. The power domain 60 is connected to the power line 211 via the power switch 63.

Similarly, upon receipt of an instruction in response to the control signal 32 from the CPU 30 to connect or disconnect the power line for supplying power to the power domain 50 to/from the power line 211, the controller 17 recognizes the worst execution time and the required processing time of an operation performed by the internal circuit 51 in association with the task. The controller 17 outputs the control signal 13. That is, the controller 17 outputs the control signal 13 with a logic state based on which the power switch 52 is turned on from the beginning of the operation of the internal circuit 51 in association with the task to the end of the required processing time. Next, the controller 17 outputs the control signal 13 with a logic state based on which the power switch 52 is turned off from the completion of the operation of the internal circuit 51 in association with the task, that is, from the end of the required processing time, to the worst execution time. Thereafter, the controller 17 outputs the control signal 13 with a logic state based on which the power switch 52 is turned on in order to give an instruction for the next task. When the internal circuit 51 is not operating during the task, the required processing time is recognized as zero.

Similarly, upon receipt of an instruction in response to the control signal 32 from the CPU 30 to connect or disconnect the power line for supplying power to the power domain 60 to/from the power line 211, the controller 17 recognizes the worst execution time and the required processing time of an operation performed by the internal circuit 61 in the power domain 60. The controller 17 outputs the control signal 14. Note that the controller 17 controls the logic state of the control signal 14, which determines turning on/off of the power switch 63, in accordance with the operating state of the internal circuit 61. The manner in which the logic state of the control signal 14 is controlled is similar to that in which the logic state of the control signal 13 is controlled.

The RAM unit 16 is a storage circuit that stores, when, for example, the controller 17 receives the control signal 32 from the CPU 30 or the external signal 300, a control program defining an operation performed by the controller 17 and the worst execution time and the required processing time set for each of the foregoing tasks and for each of the internal circuits 51 and 61. By reading the foregoing control program, the controller 17 performs an operation to control a power gating circuit.

The controller 17 controls the power gating operation for the power domains 50 and 60 and the CPU 30 in accordance with the above-described worst execution time and required processing time set for each task.

The internal circuit 61 is a circuit block including a logic circuit and a RAM circuit 62. Under control of the internal circuit 51, the internal circuit 61 controls the RAM circuit 62. Therefore, the internal circuit 61 operates in association with the internal circuit 51. That is, when the internal circuit 61 operates, so does the internal circuit 51 for sure. However, even when the internal circuit 51 operates, the internal circuit 61 does not always operate. In that case, when connecting a signal 64 from the internal circuit 61 to the internal circuit 51, it is not necessary to connect the signal 64 to the internal circuit 51 via an isolator circuit (OR circuit). When no power is supplied to the internal circuit 61 and the logic state of the signal 64 is indefinite (so-called Hi-z), no power is supplied to the internal circuit 51, which eliminates the possibility of a malfunction.

The OR circuit 70 is a circuit which receives at one terminal the control signal 33 from the CPU 30, receives at another terminal the control signal 15a from the PMU 10, and outputs a signal 71 with a logic state obtained by performing a logic OR operation on the control signal 33 and the control signal 15a. When no power is being supplied to the CPU 30 via the power switch 31, the PMU 10 sets the logic state of the control signal 15a to "H". In contrast, when power is being supplied to the CPU 30, the PMU 10 sets the logic state of the control signal 15a to "L". That is, the OR circuit 70 is a circuit (so-called isolator circuit) that disables or isolates a signal from a circuit that has been turned off.

The foregoing circuit for disabling a signal may be implemented by an AND circuit that performs a logic AND operation on an input signal received at one input terminal and another input signal received at another input terminal. In that case, when no power is being supplied to the CPU 30 via the power switch 31, the logic state of the control signal 15a is "L". In contrast, when power is being supplied to the CPU 30, the logic state of the control signal 15a is "H".

The OR circuit 80 is a circuit that receives at one terminal a control signal 53 from the internal circuit 51, receives at another terminal the control signal 15b from the PMU 10, and outputs a signal 81 with a logic state obtained by performing a logic OR operation on the control signal 53 and the control signal 15b. When no power is being supplied to the power domain 50 via the power switch 52, the PMU 10 sets the logic state of the control signal 15b to "H". In contrast, when power is being supplied to the power domain 50, the PMU 10 sets the logic state of the control signal 15b to "L". That is, the OR circuit 80 is a circuit that disables a signal from a circuit that has been turned off. This circuit for disabling a signal (namely, a so-called isolator circuit) may be implemented by an AND circuit.

The OR circuit 90 is a circuit that receives at one terminal a control signal 54 from the internal circuit 51, receives at another terminal the control signal 15c from the PMU 10, and outputs a signal 91 with a logic state obtained by performing a logic OR operation on the control signal 54 and the control signal 15c. When no power is being supplied to the power domain 50 via the power switch 52, the PMU 10 sets the logic state of the control signal 15c to "H". In contrast, when power is being supplied to the power domain 50, the PMU 10 sets the logic state of the control signal 15c to "L". That is, the OR circuit 90 is a circuit that disables a signal from a circuit that has been turned off. This circuit for disabling a signal (namely, a so-called isolator circuit) may be implemented by an AND circuit.

The OR circuits 70, 80, and 90 operate by receiving power from the power line 211.

Figures 2A, 2B:
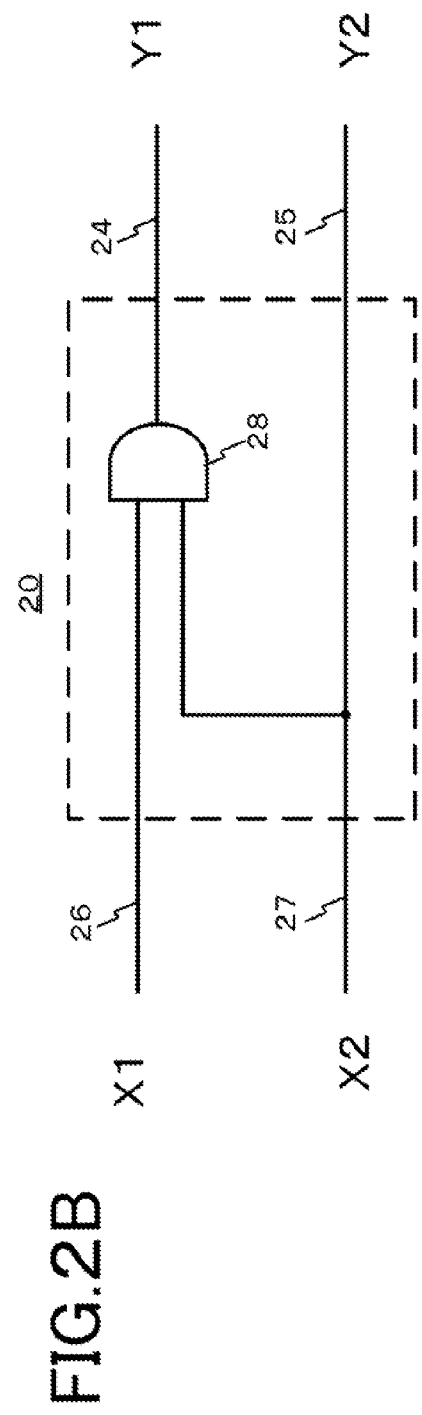
FIGS. 2A and 2B illustrate details of a protection circuit.

The protection circuit 20 receives the control signal 13 and the control signal 14 from the PMU 10, converts the logic states thereof, and outputs the converted signals as control signals 21 and 22. Referring to FIGS. 2A and 2B, the logic conversion and the protection circuit 20 will now be described in detail. The protection circuit 20 operates by receiving power from the power line 211.

The power switch 31 is a power switch for connecting the power line 211 to a power line in the CPU 30 in accordance with the logic state of the control signal 11. The power switch 31 is implemented by, for example, a MOS transistor.

The power switch 52 is a power switch for connecting the power line 211 to a power line in the power domain 50 in accordance with the logic state of the control signal 21. The power switch 52 is implemented by, for example, a MOS transistor.

The power switch 63 is a power switch for connecting the power line 211 to a power line in the power domain 60 in accordance with the logic state of the control signal 22. The power switch 63 is implemented by, for example, a MOS transistor.

Referring to FIGS. 2A and 2B, the protection circuit 20 will be described in detail. The table shown in FIG. 2A is a table which indicates the states of the power switches 52 and 63 in accordance with the logic states of the control signals 13 and 14 and the states of the power switches 52 and 63 in accordance with the logic states of the control signals 21 and 22 obtained by converting by the control signals 13 and 14 using the protection circuit 20.

The logic states of the control signals 13 and 14 can be the logic state "L" or the logic state "H". It is assumed that X1 is the state of the power switch 63 in accordance with the logic state of the control signal 13, and X2 is the state of the power switch 52 in accordance with the logic state of the control signal 14. Then, four combinations of X1 and X2 are possible, as indicated by the column "Input" of the table.

The internal circuit 61 operates in association with the internal circuit 51. That is, when the internal circuit 61 operates, so does the internal circuit 51 for sure. However, even when the internal circuit 51 operates, the internal circuit 61 does not always operate.

Then, a situation in which the power switch 52 is off but the power switch 63 is on (the second state from the bottom in the column "Input") is prohibited. However, the circuits are not designed taking into consideration the foregoing situation. Since the signal 64 from the internal circuit 61 is directly connected to the internal circuit 51, the internal circuit 51 may fail in the foregoing situation. Since the logic state of the signal 64 becomes indefinite, a large amount of current greater than or equal to a rated amount flows through the internal circuit 51 having received the signal 64, which may result in a failure of the internal circuit 51. That is, the power switches 52 and 63 are prohibited from entering the second state from the bottom in the column "Input". However, as has been described above, a control program is installed into a PMU or CPU after completion of fabrication of a semiconductor integrated circuit. Therefore, an incorrect power control sequence may be set in the PMU or the CPU controlling the PMU.

If the controller 17 of the PMU 10 incorrectly sets the logic state of the control signal 13 to "L" and the logic state of the control signal 14 to "H", when the power switches 63 and 52 are implemented by N-type MOS transistors, the power switch 63 is turned on, and the power switch 52 is turned off. In that case, the logic state of the control signal 22 connecting to the power switch 63 and the logic state of the control signal 21 connecting to the power switch 52 are set by the protection circuit 20 so as to turn off the power switch 63 and turn off the power switch 52 (the second state from the bottom in the column "Output").

When it is assumed that Y1 is the state of the power switch 63 in accordance with the logic state of the control signal 22 and Y2 is the state of the power switch 52 in accordance with the logic state of the control signal 21, the results are indicated in the column "Output" of the table.

Therefore, the protection circuit 20 can be implemented by a circuit that has a logic conversion table corresponding to the control signals 14 and 13 and outputs the control signals 21 and 22 obtained by converting the logic states of the control signals 14 and 13 in accordance with the conversion table. In that case, the conversion table corresponds to changes in the states of the power switches 52 and 63 shown in FIG. 2A.

The protection circuit 20 can be implemented by a logic circuit, details of which will be described using FIG. 2B.

FIG. 2B illustrates an example of the protection circuit 20. The protection circuit 20 is a circuit including input terminals 26 and 27, an AND circuit 28, and output terminals 24 and 25.

The control signal 14 is input to the input terminal 26, and the control signal 13 is input to the input terminal 27. One terminal of the AND circuit 28 is connected to the input terminal 26, and another terminal is connected to the input terminal 27. An output of the AND circuit 28 is connected to the output terminal 24. The input terminal 27 is connected to the output terminal 25. The output terminal 24 outputs the control signal 22. The output terminal 25 outputs the control signal 21.

Then, the protection circuit 20 outputs the control signal 22 with a logic state obtained by performing a logic AND operation on the logic state of the control signal 14 and the logic state of the control signal 13 and the control signal 21 with a logic state equivalent to that of the control signal 13. Therefore, when the power switches 52 and 63 are implemented by N-type MOS transistors, as shown in FIG. 2A, the states of the power switches 52 and 63 are changed from those shown in the column "Input" to those shown in the column "Output".

Accordingly, the semiconductor integrated circuit 100 of the first embodiment includes the internal circuit 51, the internal circuit 61 which operates in association with the internal circuit 51, the power switches 52 and 63 which supply power or cut power supply to corresponding internal circuits in accordance with the logic states of the control signals 21 and 22, the power switch controller which outputs the control signals 13 and 14 for controlling supplying power or cutting power supply using the power switches 52 and 63, and the protection circuit 20 which is provided between the power switches 52 and 63 and the power switch controller, receives the control signals 13 and 14, converts the logic states of the received control signals 13 and 14, and outputs the control signals 21 and 22.

In the semiconductor integrated circuit 100 with a power gating function, for the internal circuit 51 and the internal circuit 61 operating in association with each other, the protection circuit 20 converts the logic states of the control signals 13 and 14 output from the power switch controller to generate the control signals 21 and 22 so that a situation in which no power is supplied to the internal circuit 51 while power is being supplied to the internal circuit 61 can be avoided.

Accordingly, a situation in which, while the internal circuit 51 in one power domain 50 is connected to the power supply, the internal circuit 61 in the other power domain 60 is not connected to the power supply is avoided, thereby protecting the internal circuit 51.

Since the semiconductor integrated circuit 100 includes the protection circuit 20 described above, even when an incorrect power control sequence is set by a control program in the PMU 10 or the CPU 30 controlling the PMU 10, a situation in which, while power is being supplied to the internal circuit 51, no power is being supplied to the internal circuit 61 can be avoided. Since the signal 64 from the internal circuit 61 to the internal circuit 51 does not become indefinite, the internal circuit 51 will not fail.

Second Embodiment

In the semiconductor integrated circuit 100 of the first embodiment, the power supply common to the internal circuit 51 and the internal circuit 61 has been employed. However, a higher power supply voltage for internal circuits including a RAM circuit is advantageous in order to achieve a high operation speed.

Accordingly, a semiconductor integrated circuit 110 according to a second embodiment includes, besides the structure of the semiconductor integrated circuit 100 of the first embodiment, internal circuits to which different power supply voltages are applied.

Figure 3:
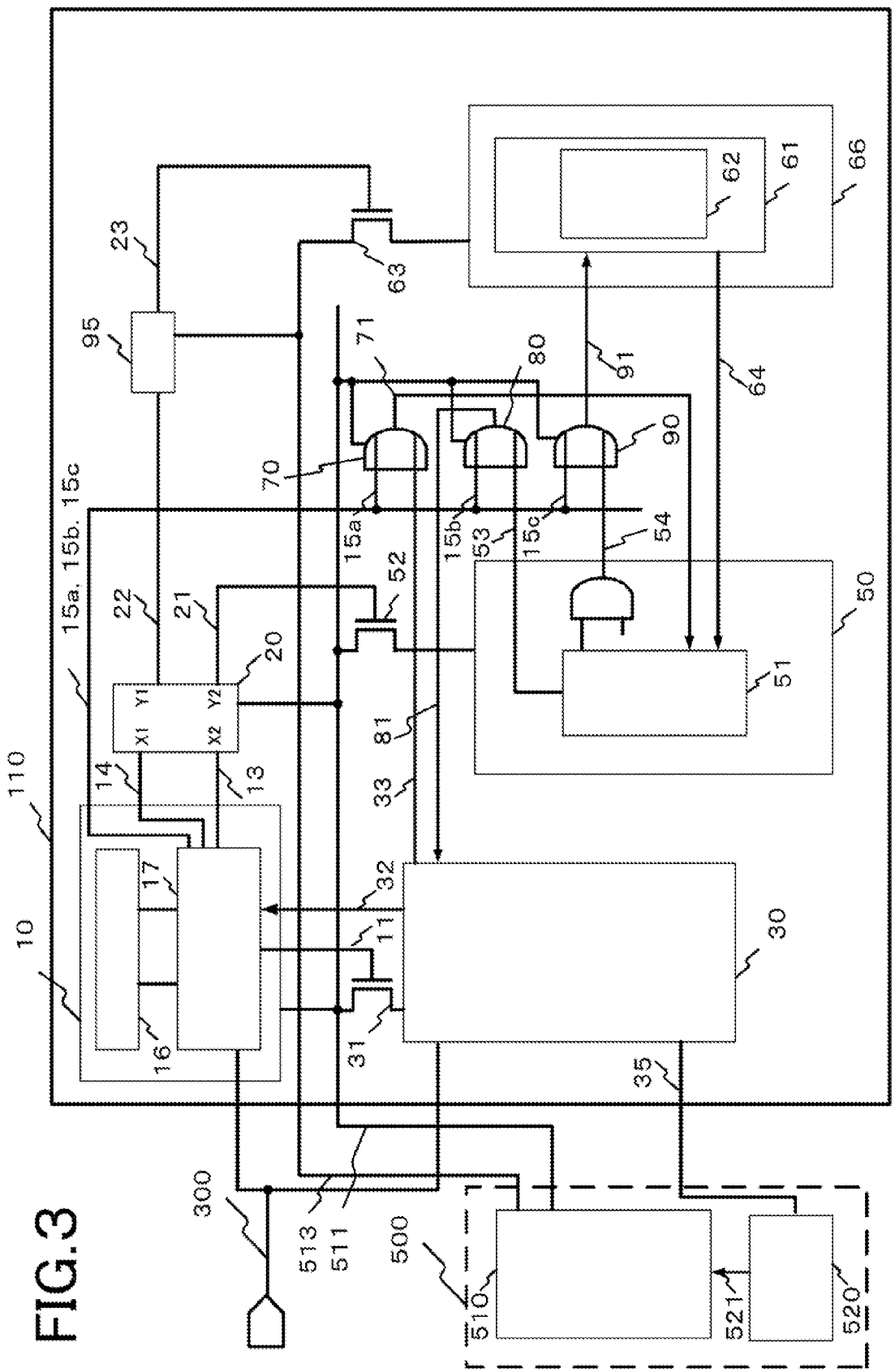
FIG. 3 is a diagram showing a semiconductor integrated circuit according to a second embodiment of the present invention and a power IC.

Referring to FIG. 3, the semiconductor integrated circuit 110 according to the second embodiment and a power IC 500 will be described.

The power IC 500 includes a large-scale integrated circuit (LSI) power supply 510 and a controller 520. The controller 520 is a circuit that receives the code signal 35 from the CPU 30 included in the semiconductor integrated circuit 110 and outputs an instruction signal 521 to the LSI power supply 510 to instruct the LSI power supply 510 to output a voltage specified by the code signal 35. The LSI power supply 510 is, for example, a DC to DC converter and, in response to the foregoing instruction signal 521, applies a power supply voltage specified by the CPU 30 to the semiconductor integrated circuit 110 via a power line 511 and a power line 513. The power supply voltage of the power line 513 is higher than that of the power line 511.

The semiconductor integrated circuit 110 includes the PMU 10, the protection circuit 20, the CPU 30, the power domain 50, a power domain 66, the OR circuits 70, 80, and 90, and a level shifter 95.

In the foregoing structure, the PMU 10, the protection circuit 20, the CPU 30, the power domain 50, and the OR circuits 70, 80, and 90 are circuits similar to those described in the semiconductor integrated circuit 100, detailed descriptions of which are thus not repeated to avoid redundancy.

The power domain 66 is different from the power domain 60 in that the power domain 66 is connected to the power line 513 via the power switch 63. However, the power domain 66 is similar to the power domain 60 in that the power domain 66 includes the internal circuit 61 including the RAM circuit 62.

The level shifter 95 is a circuit that receives the control signal 22 and outputs a control signal 23 obtained by shifting the potential of the "H" logic level of the control signal 22 from a potential level of the high-potential power line 511 to that of the power line 513. The level shifter 95 operates by receiving power supplied from the power line 513. The level shifter 95 can be implemented by, for example, a known differential amplifier.

Accordingly, since the voltage of the power line 513 connecting to the power domain 66 is higher, the operation of the internal circuit 61 can be advantageously performed at a higher speed.

Since the semiconductor integrated circuit 110 of the second embodiment has a circuit structure similar to that of the semiconductor integrated circuit 100 of the first embodiment, the internal circuit 51 and the internal circuit 61, which operate in association with other, operate in association with each other even in the semiconductor integrated circuit 110. When power is being supplied to the internal circuit 51, the protection circuit 20 can generate the control signals 21 and 22 by converting the logic states of the control signals 13 and 14 output from the power switch controller so that a situation in which no power is supplied to the internal circuit 61 can be avoided. Accordingly, there is an advantage that, when the power domain 50 including one internal circuit 51 is connected to the power supply, the power domain 66 including the other internal circuit 61 will not be disconnected from the power supply.

Since the semiconductor integrated circuit 110 has the protection circuit 20 described above, even when an incorrect power supply sequence is set by a control program in the PMU 10 or the CPU 30 controlling the PMU 10, a situation in which, while power is being supplied to the internal circuit 51, no power is being supplied to the internal circuit 61 can be avoided. Since the signal 64 from the internal circuit 61 to the internal circuit 51 does not become indefinite, the internal circuit 51 will not fail.

The turn of the embodiments isn't a showing the superiority and inferiority of the invention. Although the embodiments of the present inventions has been described in detail, it should be understood that the various changes, substitutions, and alterations could be made hereto without departing from the spirit and scope of the invention.

What is claimed is:

1. A semiconductor integrated circuit comprising:
a plurality of circuit blocks;
a plurality of power switches configured to supply power or cut power supply to the corresponding circuit blocks on a circuit-block-by-circuit-block basis in accordance with logic states of first control signals;
a power switch controller configured to select, upon receipt of a second control signal, which power switches to control from among the plurality of power switches, and output third control signals instructing the selected power switches to supply power or cut power supply; and
a first protection circuit provided between the power switches and the power switch controller, the first protection circuit being configured to output the first control signals, which are obtained by converting the logic states of the third control signals, to the selected power switches.

2. The semiconductor integrated circuit according to claim 1, wherein the first protection circuit includes a logic circuit.

3. The semiconductor integrated circuit according to claim 1, wherein the first protection circuit includes a conversion table and obtains the first control signals by converting the logic states of the third control signals on the basis of the conversion table.

4. The semiconductor integrated circuit according to claim 1, further comprising a second protection circuit provided between the plurality of circuit blocks, the second protection circuit being configured to prevent an output of one circuit block among the plurality of circuit blocks from being input to another circuit block among the plurality of circuit blocks.

5. The semiconductor integrated circuit according to claims 4, wherein different power supply voltages are applied to the plurality of circuit blocks.

6. The semiconductor integrated circuit according to claim 4, wherein the power switches are selected so as to supply power to the plurality of circuit blocks operating in association with each other.

7. The semiconductor integrated circuit according to claim 6, wherein the logic states of the third control signals are converted by the first protection circuit by performing logic operations on the third control signals.

8. The semiconductor integrated circuit according to claim 6, wherein an output from each of the plurality of circuit blocks operating in association with each other is directly input to a corresponding one of the plurality of circuit blocks operating in association with each other.

9. The semiconductor integrated circuit according to claim 7, wherein the plurality of circuit blocks operating in association with each other include a circuit block including a memory circuit and a circuit block including a logic circuit that receives data supplied from the memory circuit.

* * * * *